UNITED STATES PATENT OFFICE.

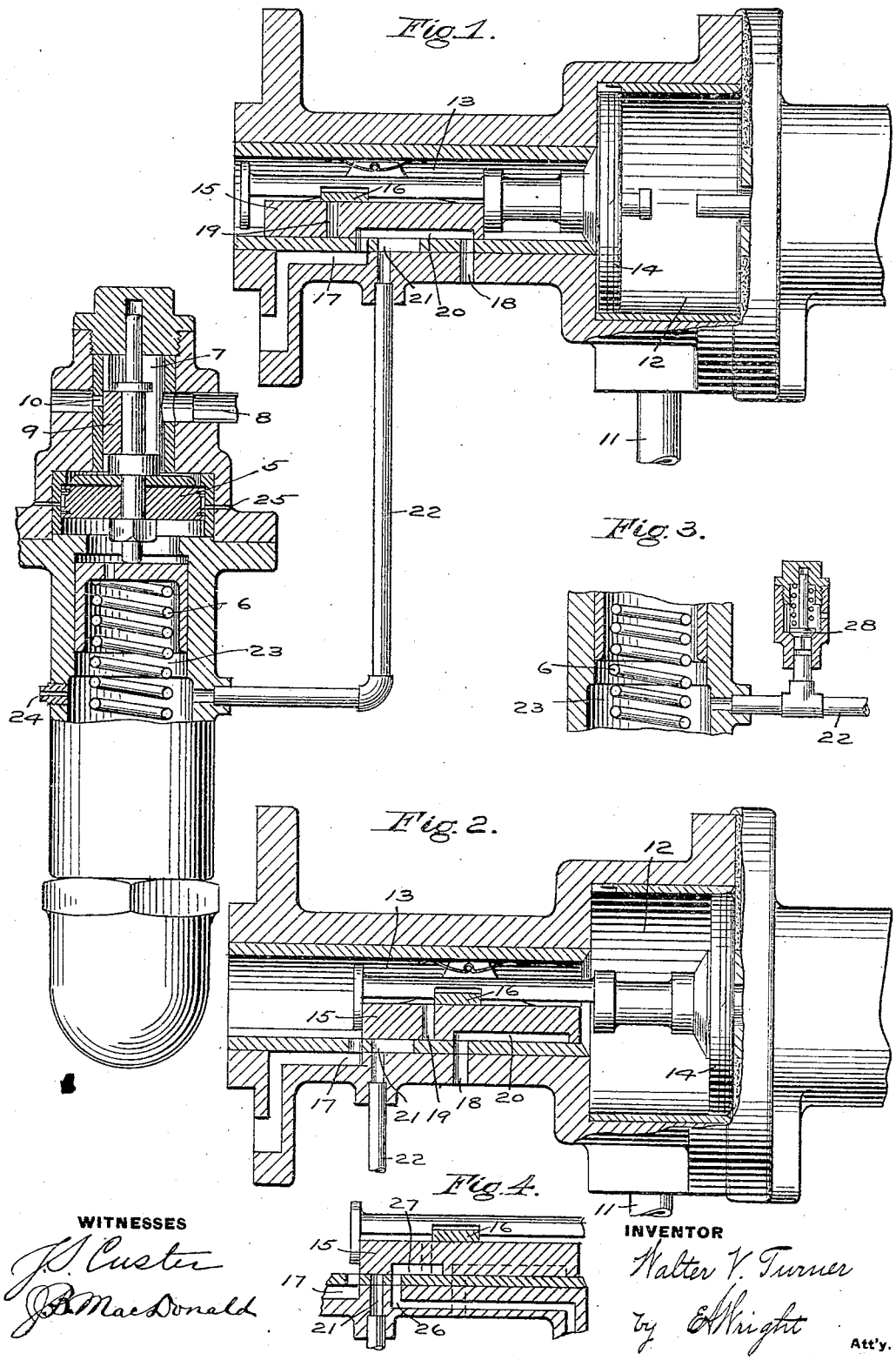

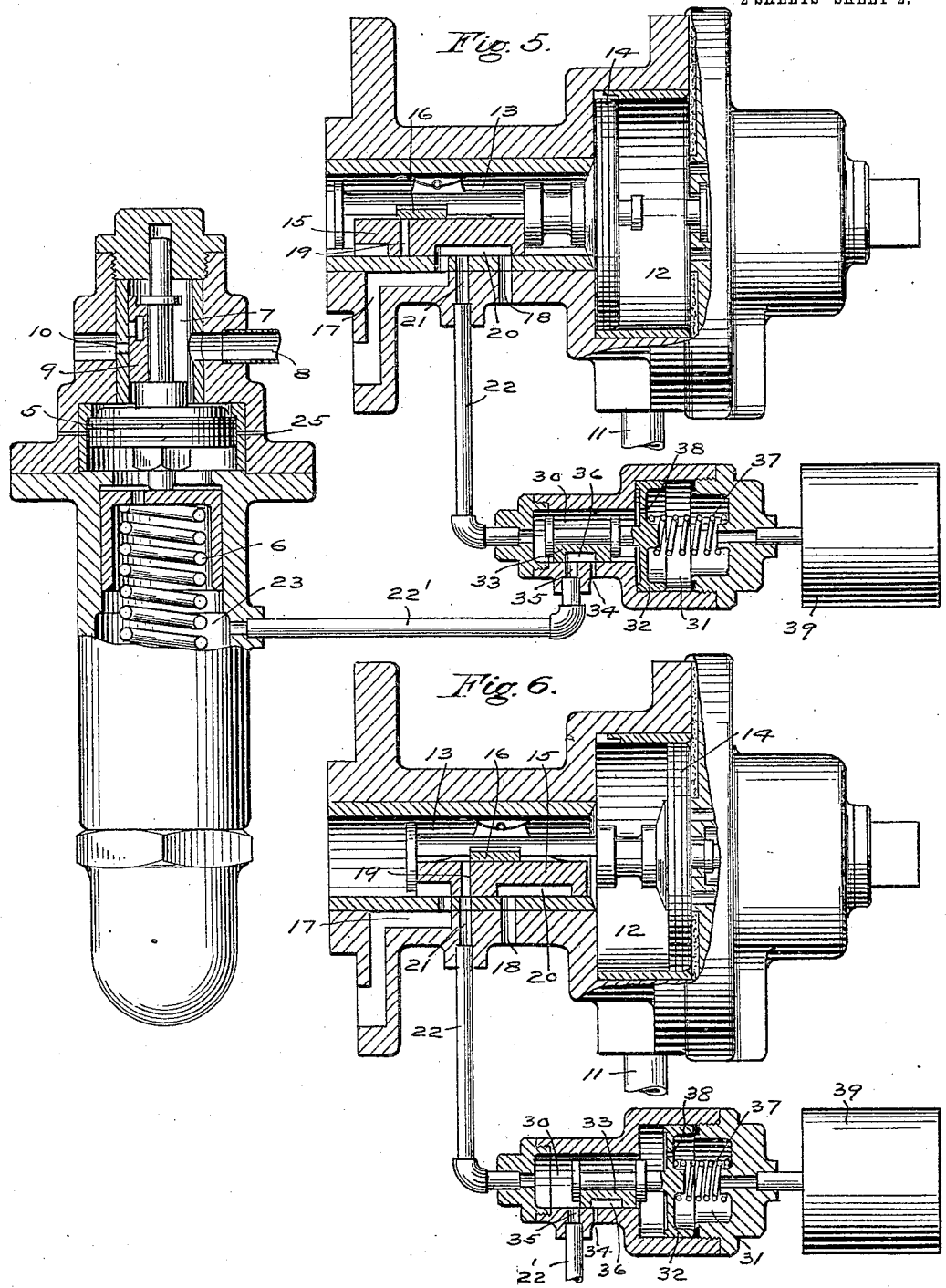

WALTER V. TURNER, OF WILKINSBURG, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

HIGH-SPEED BRAKE.

936,059.  Specification of Letters Patent.  Patented Oct. 5, 1909.

Application filed May 26, 1905. Serial No. 262,415.

*To all whom it may concern:*

Be it known that I, WALTER V. TURNER, a citizen of the United States, residing in Wilkinsburg, in the county of Allegheny and State of Pennsylvania, have invented a certain new and useful Improvement in High-Speed Brakes, of which the following is a specification.

This invention relates to automatic fluid pressure brakes, and more particularly brake apparatus adapted for use on trains which are run at a high rate of speed.

It is well known that a much greater pressure may be applied to the brake shoes of cars running at a high speed than at a lower or moderate speed without danger of sliding the wheels, and in order to make efficient stops in high speed service it has heretofore been customary to operate the brake system at a much higher pressure and to provide what is known as a high speed reducing valve connected to the brake cylinder for blowing off to the atmosphere such fluid under pressure as may be admitted to the brake cylinder above a predetermined degree of pressure in service applications, but adapted in emergency applications to permit the accumulation of a considerably higher pressure in the brake cylinder and afterward, during a certain time interval, to blow said pressure down gradually to a predetermined amount. It has been found that under ordinary conditions of high speed service this excessively high degree of brake cylinder pressure may be safely retained in emergency applications a much longer period than it was at first supposed, and the principal object of this invention is the provision of improved means, operating in emergency applications of the brake, to hold the brake cylinder outlet closed and retain the high pressure therein for a predetermined period of time, which may be made as long as desired, and operating in service applications to open said outlet and allow the escape of all pressure admitted to the brake cylinder above a certain permissible maximum degree which may be safely applied in service applications, and below which the brake cylinder outlet is closed.

According to another feature of my invention, the rate at which the brake cylinder pressure diminishes after the opening of the blow down valve or outlet may be adjusted to give any result desired.

In the accompanying drawings, Figure 1 is a sectional view showing a triple valve device and a reducing valve device embodying my invention; Fig. 2 a sectional view of the triple valve showing the parts in the emergency application position; Fig. 3 a fragmentary view showing a portion of the spring chamber with a spring seated valve for governing the restricted discharge outlet; Fig. 4 a broken sectional view of the triple valve slide valve and seat showing a slight modification for venting air from the train pipe to the spring chamber in emergency applications; Fig. 5 a sectional view similar to Fig. 1 but showing a modification of my improvement; and Fig. 6 a similar sectional view showing the parts of the valve devices in the emergency application position.

According to the construction shown, I employ a reducing valve device of the usual type having a piston or movable abutment 5, subject to the opposing pressures of the adjustable spring 6 and the brake cylinder pressure in chamber 7, which may communicate with the brake cylinder through pipe 8, for operating the valve 9 controlling the outlet port 10 to the atmosphere. The triple valve device may be of the ordinary construction having train pipe connection 11, piston chamber 12, valve chamber 13, piston 14, main slide valve 15, and graduating valve 16, with the usual brake cylinder port 17, exhaust port 18, service port 19, and exhaust cavity 20. An additional port 21, which may have an elongated opening, is located in the valve seat, and is connected by means of pipe 22 with the spring chamber 23 of the reducing valve, which has a restricted port opening 24 communicating with the atmosphere.

The chamber 23 is normally open to the atmosphere through the pipe 22, port 21, exhaust cavity 20 and exhaust port 18, and port 21 may be so located as to remain in communication with the atmosphere for all positions of the valve 15 except the emergency position. In moving to the latter position, some port, such as service port 19, establishes communication from the auxiliary reservoir or other source of supply to port 21 by passing over the same when the exhaust is closed, thereby supplying a certain amount of air to the chamber 23 below the piston 5 of the reducing valve device. Vent ports 25 may be located in the casing opposite the piston, to permit the escape to the atmosphere of any leakage of air from the chamber 7 around the piston, and thereby prevent such leakage from affecting the pressure in chamber 23 below the piston.

It is obvious that the additional ports in the triple valve, or other valve operated by variations in train pipe pressure, may be arranged in any desirable manner to maintain communication from pipe 22 open to the atmosphere in service application position, but to supply air to the chamber 23 when the valve moves to emergency position under a sudden reduction in train pipe pressure, and Fig. 4 shows a slight modification, in which the cavity 27 in the slide valve 15 supplies air from the train pipe through port 26 to the port 21 and to the spring chamber 23.

The spring 6 of the reducing valve device being adjusted to hold a certain degree of brake cylinder pressure, say 60 lbs. per square inch, the operation of the device as shown in Fig. 1 is as follows: When a service application of the brakes is made, the chamber 23 remains in open communication with the atmosphere through port 21, cavity 20 and exhaust port 18 of the triple valve, and should a pressure in excess of 60 pounds per square inch be admitted to the brake cylinder, the piston 5 will be moved away from its seat, compressing the spring 6 and operating the valve 9 to open the discharge outlet port 10 from the brake cylinder to the atmosphere. In this manner the excess pressure may be discharged as rapidly as it accumulates in the brake cylinder, thereby limiting the pressure in service applications to a desired safe degree. When a sudden reduction in train pipe pressure is made for an emergency application, the triple valve makes a full traverse, carrying the port 19 over the elongated opening to port 21 to a position in which the piston 14 is seated against its gasket and the port 21 is closed, as shown in Fig. 2. During the time that communication is open from the auxiliary reservoir, train pipe, or other source, to port 21, air flows to the chamber 23 beneath the reducing valve piston and accumulates a certain degree of pressure therein, which acts in conjunction with the spring 6 to hold the piston seated and the valve closed, the pressure in chamber 23 gradually diminishing by discharge through the restricted vent hole 24. The high brake cylinder pressure is therefore retained in the brake cylinder for a limited and predetermined period of time, during which the pressure in chamber 23 is diminishing to an amount, which together with the force of the spring, is less than that of the opposing brake cylinder pressure, whereupon the piston and valve move down to slightly open the outlet port 10 and permit a gradual reduction in the brake cylinder pressure. It will be apparent, however, that the brake cylinder pressure can then diminish only at the same rate that the pressure in the chamber 23 reduces by escaping through the restricted outlet port 24, which rate is determined by the capacity of the chamber and the size of said outlet port. When the pressure is substantially exhausted from chamber 23, the brake cylinder pressure will have reduced to the degree for which the spring 6 is adjusted and the piston and valve will be moved up to close the outlet port 10.

If it is desired to retain a higher ultimate brake cylinder pressure in emergency applications than in service applications, a certain pressure may be held in the chamber 23, which, acting with the spring 6, will hold the discharge port 10 closed either during the entire period of the application, or will permit the blowing down of the brake cylinder pressure to a point somewhat greater than that for which the spring 6 is set for service applications. This may readily be done by providing a small safety or spring seated valve 28, such as indicated in Fig. 3, for controlling the outlet or vent port from the chamber 23 to the atmosphere. This small valve may be set to retain any desired degree of air pressure in chamber 23, and a correspondingly higher degree in the brake cylinder in emergency applications than in full service applications. If the valve 28 is set sufficiently high, or if chamber 23 is held closed, then the piston and valve will be held up and the full pressure that may be admitted to the brake cylinder in an emergency application will be retained therein throughout the full period of the stop.

According to the modified form of my improvement, as shown in Figs. 5 and 6, an additional emergency valve device is interposed in the pipe 22, comprising a valve chamber 30 and piston chamber 31 containing a valve 33 and piston 32, the capacity of chamber 31 being enlarged by reservoir 39 and the piston having a restricted port 38 for feeding said chamber. A spring 37 normally holds the piston and valve in a position to cover port 35, leading by pipe 22' to chamber 23 of the reducing valve device, while the cavity 36 connects said port 35 with the restricted port 34 and the atmosphere. The chambers 30 and 23 are therefore open to the atmosphere when the brakes are released, and also in service applications, so that the reducing valve device operates in the usual manner to limit the brake cylinder pressure to the desired degree. When an emergency application is made, however, the triple valve makes its full travel and supplies air through the port 21 to the valve chamber 30, which, acting on piston 32 instantly moves the same over against its seat, compressing spring 37 and opening communication through port 35 and pipe 22' to chamber 23 of the reducing valve. Air under pressure then flows into chamber 23 and with the spring 6 holds the piston 5 seated and the discharge outlet 10 closed. Air also feeds slowly through the restricted port 38 into chamber 39 for a predetermined period of time until the pressure on opposite sides of piston 32 substantially equalizes, when the spring 37 moves the valve 33 back to normal position and opening communication from the chamber 23 to the atmosphere through port 34. This allows the pressure beneath the reducing valve piston to diminish slowly, as before described, and permits a gradual blowing down of the brake cylinder pressure to the degree for which the spring 6 is adjusted. It will be observed that this construction comprises two time elements, first, the period required for equalizing the pressures upon the piston 32, and second, the period for bleeding down the pressure in chamber 23 through the restricted port 34, so that by adjusting the size of these ports any desired action of the device may be secured.

Having now described my invention, what I claim as new and desire to secure by Letters Patent is:—

1. In a fluid pressure brake, the combination with a brake cylinder and a blow-down valve therefor, of a piston subject to variations in train pipe pressure, and a slide valve operated by said piston for admitting air from the brake cylinder to the blow-down valve, to operate the same.

2. In a fluid pressure brake, the combination with a brake cylinder and a blow-down valve therefor, of a triple valve device having a piston and slide valve operated by variations in train pipe pressure for controlling the blow-down valve.

3. In a fluid pressure brake, the combination with a movable abutment or valve subject in one direction to the brake cylinder pressure for controlling a brake cylinder discharge port, of a piston subject to the variations in train pipe pressure, and a slide valve operated by said piston in emergency applications for supplying fluid pressure to hold said discharge port closed.

4. In a fluid pressure brake, the combination with a movable abutment or valve subject in one direction to the brake cylinder pressure for controlling a brake cylinder discharge port, of a triple valve having a piston and slide valve operated by variations in train pipe pressure and a port controlled by said slide valve for supplying fluid pressure to hold said brake cylinder discharge port closed.

5. In a fluid pressure brake, the combination with a movable abutment or valve subject to the opposing pressures of the brake cylinder and a load device for controlling a brake cylinder discharge port, of a triple valve device having a piston and slide valve operated by variations in train pipe pressure and a port adapted to be operated by said slide valve in moving to emergency position to supply fluid pressure to the opposite side of said movable abutment.

6. In a fluid pressure brake, the combination with a movable abutment operated by brake cylinder pressure for controlling a brake cylinder outlet, of means operated by a sudden reduction in train pipe pressure in emergency applications for supplying air from the auxiliary reservoir to oppose the action of the brake cylinder pressure upon said abutment.

7. In a fluid pressure brake, the combination with a movable abutment or valve subject to the opposing pressures of the brake cylinder and a spring for controlling a brake cylinder discharge port, of a valve device operated by a sudden reduction in train pipe pressure in emergency applications for supplying air from the auxiliary reservoir to assist the spring in holding the discharge port closed.

8. In a fluid pressure brake, the combination with a movable abutment or valve subject in one direction to the brake cylinder pressure for controlling a brake cylinder discharge port, of a piston subject to the variations in train pipe pressure, and a slide valve operated by said piston in emergency applications for supplying air from the auxiliary reservoir to hold said discharge port closed.

9. In a fluid pressure brake, the combination with a movable abutment or valve subject to the opposing pressures of the brake cylinder and a load device for controlling a brake cylinder discharge port, of a triple valve device having a piston and slide valve operated by variations in train pipe pressure and a port adapted to be operated by said slide valve in moving to emergency position to supply air from the auxiliary reservoir to the opposite side of said abutment.

10. In a fluid pressure brake, the combination with a brake cylinder, and a blow-down valve subject to the brake cylinder pressure for controlling a discharge port, of a triple valve device having a slide valve and piston operating under a sudden reduction in train pipe pressure to govern the action of the blow-down valve.

11. In a fluid pressure brake, the combination with a movable abutment subject on one side to brake cylinder pressure for controlling a brake cylinder discharge port, of a valve device operated by a sudden reduction in train pipe pressure in emergency applications for supplying air to a chamber for opposing the action of the brake cylinder pressure on said abutment, a vent port from said chamber, and a valve for governing said vent port.

In testimony whereof I have hereunto set my hand.

WALTER V. TURNER.

Witnesses:
 R. F. EMERY,
 J. B. MACDONALD.